Nov. 25, 1930. H. O. ANDERSON 1,782,497
CLAM CATCHING IMPLEMENT
Filed Oct. 8, 1929 2 Sheets-Sheet 1
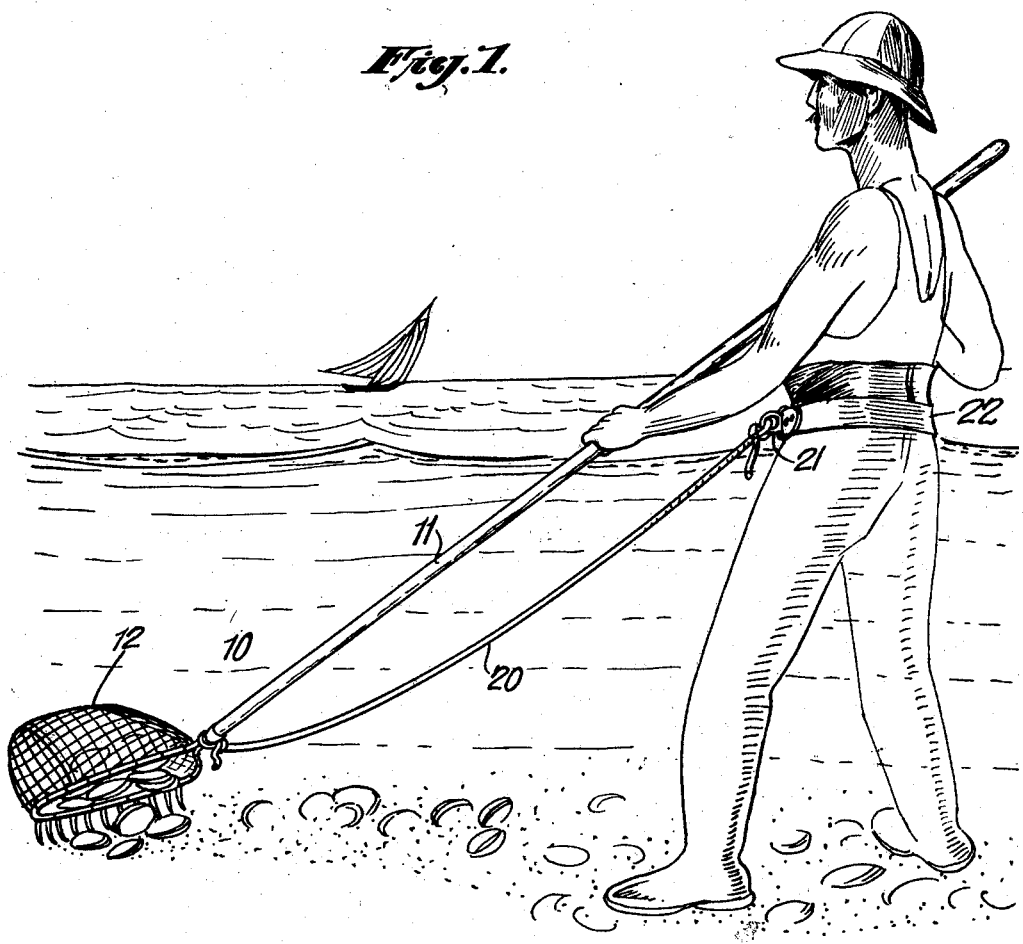
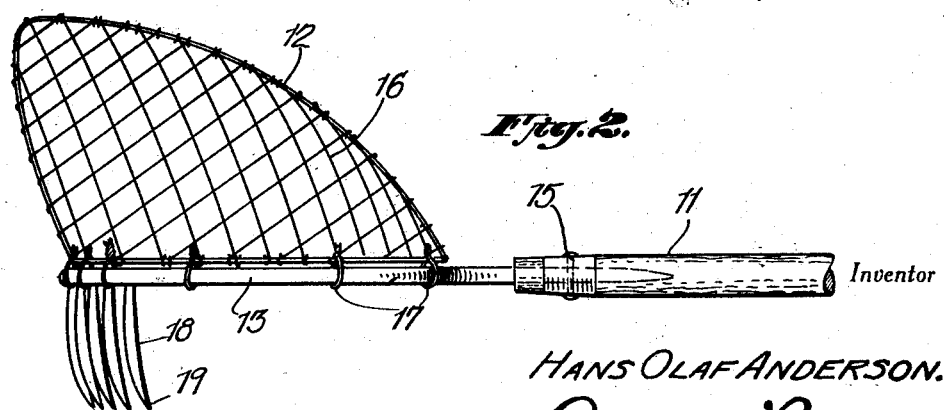
Inventor
HANS OLAF ANDERSON.
By *Clarence A. O'Brien*
Attorney Nov. 25, 1930.   H. O. ANDERSON   1,782,497
CLAM CATCHING IMPLEMENT
Filed Oct. 8, 1929   2 Sheets-Sheet 2
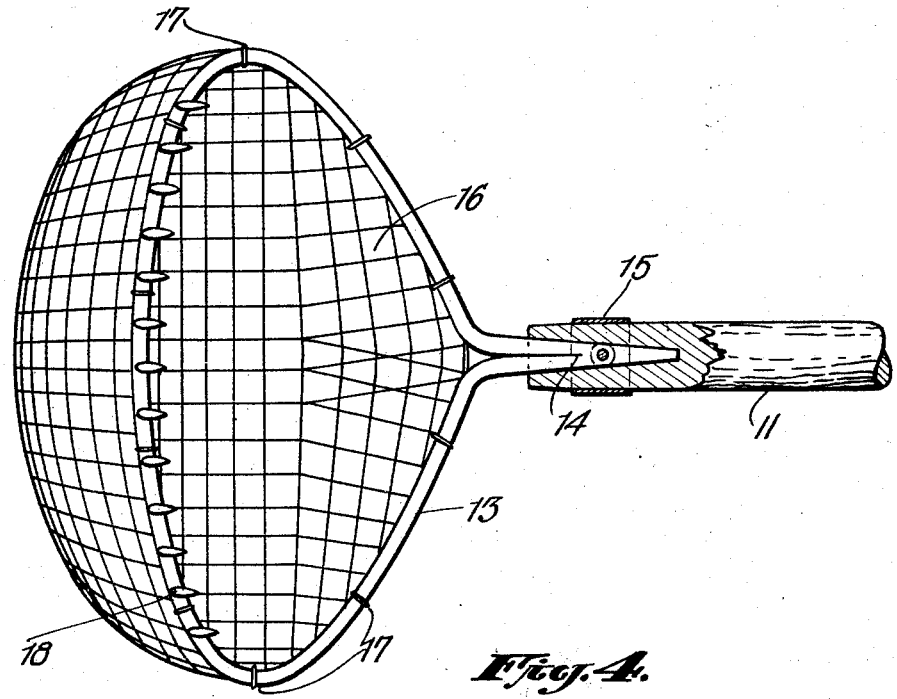
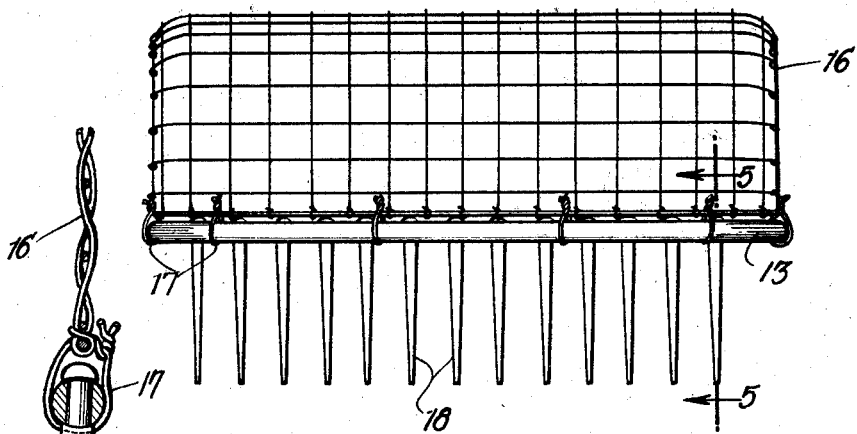
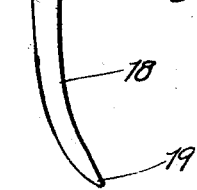
Inventor
HANS OLAF ANDERSON.
By Clarence A. O'Brien
Attorney Patented Nov. 25, 1930

1,782,497

UNITED STATES PATENT OFFICE

HANS OLAF ANDERSON, OF HAMPTON BAYS, NEW YORK

CLAM-CATCHING IMPLEMENT

Application filed October 8, 1929. Serial No. 398,196.

The primary object of the invention resides in a device for the catching of clams, oysters, scallops and other shell fish which inhabit the depths of bodies of water and which bury themselves in the bottom or water bed, and which consists in a wire basket having teeth extending therefrom by which the shell fish may be raked loose into the basket and in turn brought to the surface.

Another object is to provide a clam catching implement which may be easily manipulated by a user when wading in shallow water, or by an operator from a boat when operating in deep water.

A further object of the invention is the provision of a clamming instrument which may be manipulated by ladies and children, as well as men, by which those unskilled in the art of catching clams may enjoy the sport and pleasure derived therefrom.

A still further object is to provide a clamming instrument which is simple and strong of construction, relatively light in weight, and comparatively inexpensive of manufacture.

With these and other objects in view, the invention resides in certain novel construction, combination and arrangement of parts, the essential features of which are hereinafter described, are particularly pointed out in the appended claim and are illustrated in the accompanying drawings, in which:

Figure 1 is a perspective view of my improved clamming instrument showing the same in use.

Figure 2 is an enlarged detail vertical longitudinal sectional view through the head end of the implement.

Figure 3 is a plan view looking in the direction of the open side of the basket.

Figure 4 is a rear end elevational view.

Figure 5 is an enlarged detail vertical sectional view on the line 5—5 of Figure 4.

Referring to the drawings by reference characters, the numeral 10 designates my clamming instrument in its entirety which includes an elongated handle member 11 having a basket head 12 fixedly mounted to one end thereof. The head 12 includes a metal frame 13 formed of a single length of bendable material bent into a substantially elliptical shape as shown in Figure 3 of the drawing with the free ends brought into meeting engagement and extending in an angular direction to provide a pointed shank 14 for insertion into one end of the handle member 11. A reinforcing sleeve or collar 15 encircles the lower end of the handle 11 to reinforce the same and prevent accidental separation of the head from the handle. Carried by the frame 13 is a wire mesh basket 16, the mouth of which corresponds to the shape of the frame 13, and which basket is secured to the frame by wire clips or rings 17 which encircle the frame 13 and the rim wire of the said basket as clearly shown in Figures 4 and 5 of the drawings. The wire basket is preferably constructed of a galvanized wire so as to be rust proof, and by securing the basket to the frame in the manner shown, the basket may be removed when desired and replaced by a new one when worn or damaged.

The outer curved side of the frame 13 is provided with a row of spaced outwardly extending curved teeth 18, the free ends of which are pointed as at 19.

In use of the implement, the operator grasps the handle member 11 and turns the implement so that the row of teeth 18 scrape the bottom of the water bed, whereupon the basket 16 is disposed with its closed side up. By drawing the basket head 12 over the water bottom, the teeth 18 will tend to rake up or loosen any clams or like shell fish causing the same to enter the basket 16 and be trapped therein during the dragging of the head over the bottom. When the basket has become sufficiently filled with clams, the handle member 11 is turned to present the open side of the basket face up, whereupon the clams which have been collected therein may be lifted to the surface and emptied. It will be appreciated that it is only necessary for the operator to actuate the implement similar to an ordinary rake in order to collect the clams in the basket.

The implement may be constructed in various sizes and for use in connection with the large size implement, I provide a flexible pull cord or cable 20, one end of which is tied or connected to the handle member adjacent the basket head, while the other end is fastened to an eye or other connecting member 21 provided on a waist encircling belt 22. The belt 22 is secured about the waist of the operator as clearly shown in Figure 1 of the drawing and in the use of the same the operator merely guides the implement by the grasping of the handle 11 and pulls the same along as he walks in a backward direction. By the use of the pull cord and belt, the efforts of the operator are materially reduced as the load in the basket becomes heavy as it fills with the clams.

While I have shown and described what I deem to be the most desirable embodiment of my invention, I wish it to be understood that various changes may be made if desired, and I therefore do not limit myself to the details herein shown nor to anything less than the whole of my invention limited only by the appended claim.

Having thus described the invention, what I claim as new and desire to secure by Letters Patent is:—

A clam digging implement comprising a substantially circular member, a rigid handle attached thereto, a plurality of rigid teeth secured to said circular member at the side spaced with respect to said handle, a basket like structure having an open side adapted to conform in shape to said circular member, and means for securing said basket like member to said circular member with its open side conforming thereto.

In testimony whereof I affix my signature.

HANS OLAF ANDERSON.